United States Patent
Kyuma et al.

(10) Patent No.: US 7,907,182 B2
(45) Date of Patent: Mar. 15, 2011

(54) IMAGE DATA REDUCTION APPARATUS AND METHOD, PROGRAM, STORAGE MEDIUM, AND IMAGE SENSING APPARATUS

(75) Inventors: Kenji Kyuma, Kanagawa (JP); Yoshihito Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1211 days.

(21) Appl. No.: 10/969,451

(22) Filed: Oct. 20, 2004

(65) Prior Publication Data

US 2005/0083415 A1    Apr. 21, 2005

(30) Foreign Application Priority Data

Oct. 21, 2003 (JP) ................................ 2003-361134

(51) Int. Cl.
H04N 5/225 (2006.01)
H04N 9/083 (2006.01)
H04N 5/228 (2006.01)
G06K 9/40 (2006.01)
G06K 9/32 (2006.01)

(52) U.S. Cl. .................. 348/220.1; 348/273; 348/222.1; 382/254; 382/300

(58) Field of Classification Search ............... 348/387.1, 348/390.1, 568, 272, 280, 538, 220, 222, 348/273, 220.1
See application file for complete search history.

(56) References Cited

U.S. PATENT DOCUMENTS

| | | | | |
|---|---|---|---|---|
| 5,828,406 A | * | 10/1998 | Parulski et al. | 348/220.1 |
| 6,320,593 B1 | * | 11/2001 | Sobel et al. | 345/600 |
| 6,348,929 B1 | * | 2/2002 | Acharya et al. | 345/660 |
| 6,686,960 B2 | | 2/2004 | Iizuka | |
| 6,747,698 B2 | * | 6/2004 | Abe | 348/273 |
| 7,158,178 B1 | * | 1/2007 | Acharya | 348/280 |

(Continued)

FOREIGN PATENT DOCUMENTS

EP       0 720 388 A2    7/1996

(Continued)

OTHER PUBLICATIONS

European Search Report of corresponding European Patent Application No. EP 04 25 6480; dated Apr. 25, 2006 (3 pages).

*Primary Examiner* — Lin Ye
*Assistant Examiner* — Mekonnen Dagnew
(74) *Attorney, Agent, or Firm* — Cowan, Liebowitz & Latman, P.C.

(57) ABSTRACT

An object of the invention is to prevent degradation of an image as much as possible when data of the number of original pixels of an image sensing element is converted into data of a smaller number of pixels. In order to achieve this object, an image data reduction apparatus which converts first image data in which elements of a plurality of colors are arrayed within a plane into second image data having a smaller number of elements than the first image data by reducing the number of elements in the longitudinal direction, the lateral direction, or both the longitudinal and lateral directions within the plane includes an image processing circuit which performs one or both of a process of assigning one element of the first image data to one element of the second image data, and a process of processing a plurality of elements of the first image data and assigning the elements to one element of the second image data, so as to array the barycenters of the elements of the second data at equal intervals in a direction in which the number of elements is reduced out of the longitudinal direction, the lateral direction, or both the longitudinal and lateral directions.

14 Claims, 7 Drawing Sheets

U.S. PATENT DOCUMENTS

| | | | |
|---|---|---|---|
| 7,265,783 B2 * | 9/2007 | Fukuda | 348/240.2 |
| 7,456,866 B2 * | 11/2008 | Hirose | 348/222.1 |
| 2001/0030700 A1 * | 10/2001 | Mabuchi et al. | 348/302 |
| 2002/0085249 A1 | 7/2002 | Tsuda et al. | |
| 2002/0158980 A1 * | 10/2002 | Iizuka | 348/280 |

FOREIGN PATENT DOCUMENTS

| | | |
|---|---|---|
| EP | 0 720 388 A3 | 7/1996 |
| EP | 1 282 304 A1 | 2/2003 |
| EP | 1282304 A1 * | 2/2003 |
| JP | 11308560 A * | 11/1999 |

* cited by examiner

| G(1,n) | R(1,n) | G(2,n) | R(2,n) | G(3,n) | R(3,n) | | G(2m-1,n) | R(2m-1,n) | G(2m,n) | R(2m,n) |
|---|---|---|---|---|---|---|---|---|---|---|
| B(1,n) | g(1,n) | B(2,n) | g(2,n) | B(3,n) | g(3,n) | | B(2m-1,n) | g(2m-1,n) | B(2m,n) | g(2m,n) |
| G(1,n+1) | R(1,n+1) | G(2,n+1) | R(2,n+1) | G(3,n+1) | R(3,n+1) | | G(2m-1,n+1) | R(2m-1,n+1) | G(2m,n+1) | R(2m,n+1) |

| G1 | R1 | G2 | R2 | G3 | R3 | G4 | R4 |
|----|----|----|----|----|----|----|----|
| B1 | g1 | B2 | g2 | B3 | g3 | B4 | g4 |
| G6 | R6 | G7 | R7 | G8 | R8 | G9 | R9 |
| B6 | g6 | B7 | g7 | B8 | g8 | B9 | g9 |

FIG. 7

| | | | | | | | |
|---|---|---|---|---|---|---|---|
| | G'1 | R'1 | | | G'2 | R'2 | |
| | B'1 | g'1 | | | B'2 | g'2 | |
| | | | | | | | |

IMAGE DATA REDUCTION APPARATUS AND METHOD, PROGRAM, STORAGE MEDIUM, AND IMAGE SENSING APPARATUS

FIELD OF THE INVENTION

The present invention relates to a technique of reducing the number of pixels of an image signal read out from an image sensing element.

BACKGROUND OF THE INVENTION

Of digital still cameras, products having a function capable of photographing at almost the same number of recording pixels as the number of effective pixels of an image sensing element and also photographing at a smaller number of recording pixels than the number of effective pixels become commercially available. As the number of pixels of an image sensing element increases year by year, comfortable photographing without any stress on the user requires an increase in speed at the building components of a digital camera, and also reduction in the data amount of a signal subjected to an image process in photographing at a smaller number of recording pixels than the number of effective pixels.

To meet this request, Japanese Patent Laid-Open No. 11-308560 proposes a method of achieving an image process and recording at high speeds by performing a reduction process for data of the Bayer array of an original image and obtaining data of a Bayer array with a smaller number of pixels. According to the method of the data reduction process disclosed in this reference, however, the barycentric positions of pixel signals of data of a Bayer array after the reduction process are localized, and an image obtained as a result of a subsequent signal process degrades, a detailed description of which will be omitted.

Figure 6:
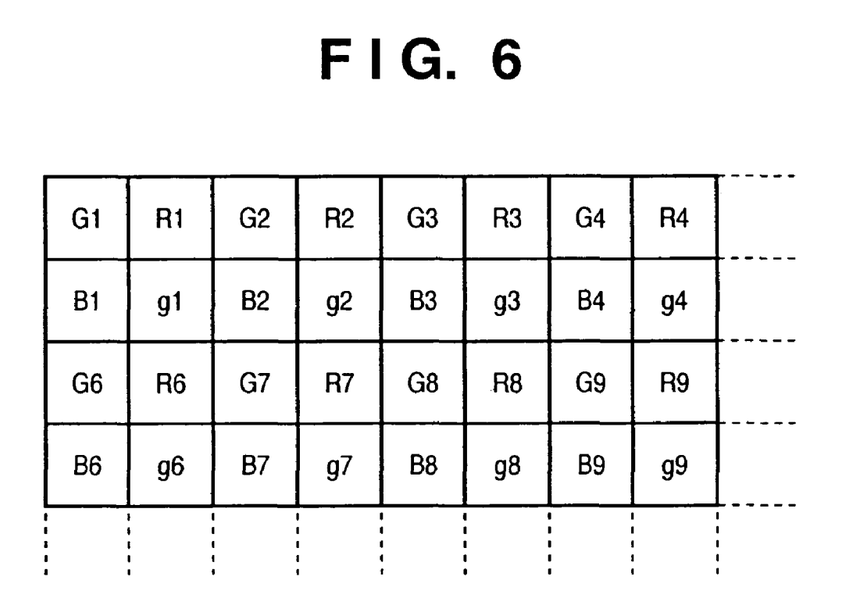
FIG. 6 is a view for explaining the prior art.
Figure 7:
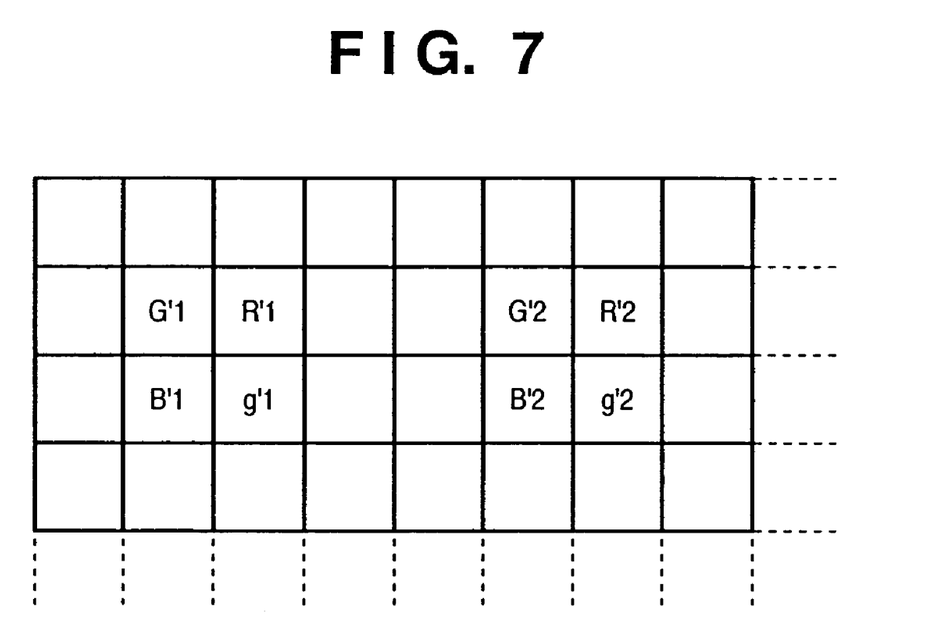
FIG. 7 is a view for explaining the prior art.

FIGS. 6 and 7 show an example of a conventional ¼ reduction process which degrades an image. FIG. 6 is a view showing the planar positions of data of a Bayer array of four G, R, B, and g colors before the reduction process. FIG. 7 is a view showing the planar barycentric positions of data after a ½ reduction process in the longitudinal and lateral directions.

The transformations of the conventional reduction process are given by $G'1=(G1+G2+G6+G7)/4$ $R'1=(R1+R2+R6+R7)/4$ $B'1=(B1+B2+B6+B7)/4$ $g'1=(g1+g2+g6+g7)/4$ As shown in FIG. 7, the pitches between the barycenters of pixels of data after the reduction process are not equal.

SUMMARY OF THE INVENTION

The present invention has been made to overcome the conventional drawbacks, and has as its object to prevent degradation of an image as much as possible when data of the number of original pixels of an image sensing element is converted into data of a smaller number of pixels.

To solve the above problems and achieve the above object, according to the first aspect of the present invention, an image data reduction apparatus which converts first image data in which elements of a plurality of colors are arrayed within a plane into second image data having a smaller number of elements than the first image data by reducing the number of elements in a longitudinal direction, a lateral direction, or both the longitudinal direction and the lateral direction within the plane comprises first image processing means for performing one or both of a process of assigning one element of the first image data to one element of the second image data, and a process of processing a plurality of elements of the first image data and assigning the elements to one element of the second image data, so as to array barycenters of the elements of the second data at equal intervals in a direction in which the number of elements is reduced out of the longitudinal direction, the lateral direction, or both the longitudinal direction and the lateral direction.

According to the second aspect of the present invention, an image sensing apparatus comprises the image data reduction apparatus, second image processing means for performing a predetermined process for second image data output from the image data reduction apparatus to generate third image data, and recording means for recording the third image data.

According to the third aspect of the present invention, an image sensing apparatus comprises first image processing means for converting first image data in which elements of a plurality of colors are arrayed within a plane into second image data having a smaller number of elements than the first image data by reducing the number of elements in a longitudinal direction, a lateral direction, or both the longitudinal direction and the lateral direction within the plane, the first image processing means performing an addition process for signals of elements of the same color in the first image data and a decimation process for signals of a plurality of elements in the first image data so as to array barycenters of the elements of the second data at equal intervals in the longitudinal direction, the lateral direction, or both the longitudinal direction and the lateral direction, and second image processing means for processing the second image data output from the first image processing means, the second image processing means performing a process of interpolating a first color signal of the second image data by a second color signal.

According to the fourth aspect of the present invention, an image data reduction method of converting first image data in which elements of a plurality of colors are arrayed within a plane into second image data having a smaller number of elements than the first image data by reducing the number of elements in a longitudinal direction, a lateral direction, or both the longitudinal direction and the lateral direction within the plane comprises performing one or both of a process of assigning one element of the first image data to one element of the second image data, and a process of processing a plurality of elements of the first image data and assigning the elements to one element of the second image data, so as to array barycenters of the elements of the second data at equal intervals in a direction in which the number of elements is reduced out of the longitudinal direction, the lateral direction, or both the longitudinal direction and the lateral direction.

According to the fifth aspect of the present invention, a program causes a computer to execute the image data reduction method.

According to the sixth aspect of the present invention, a storage medium computer-readably stores the program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described in detail below with reference to the accompanying drawings.

First Embodiment

Figure 1:
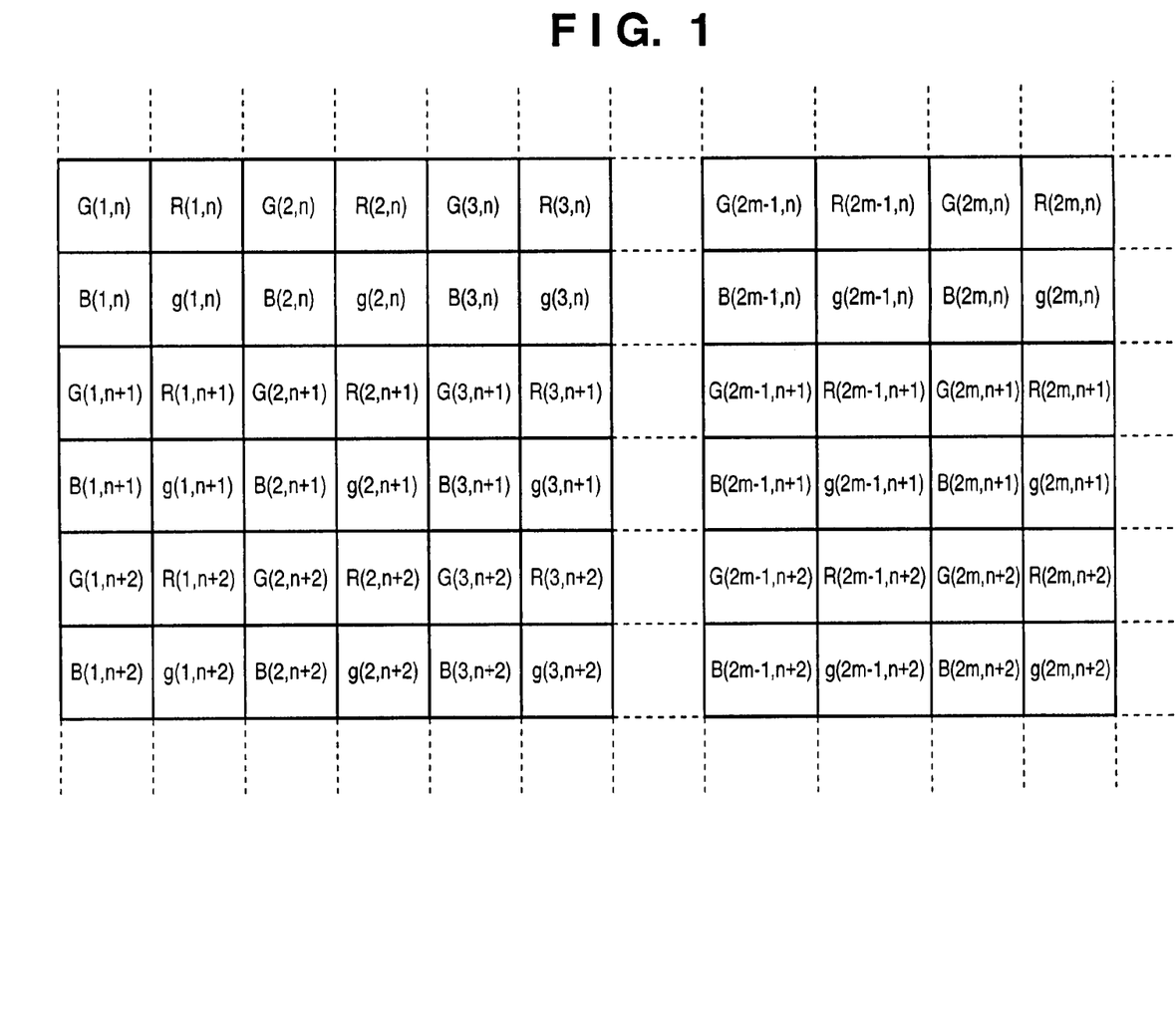
FIG. 1 is a view for explaining the first embodiment of an image data reduction method according to the present invention.
Figure 2:
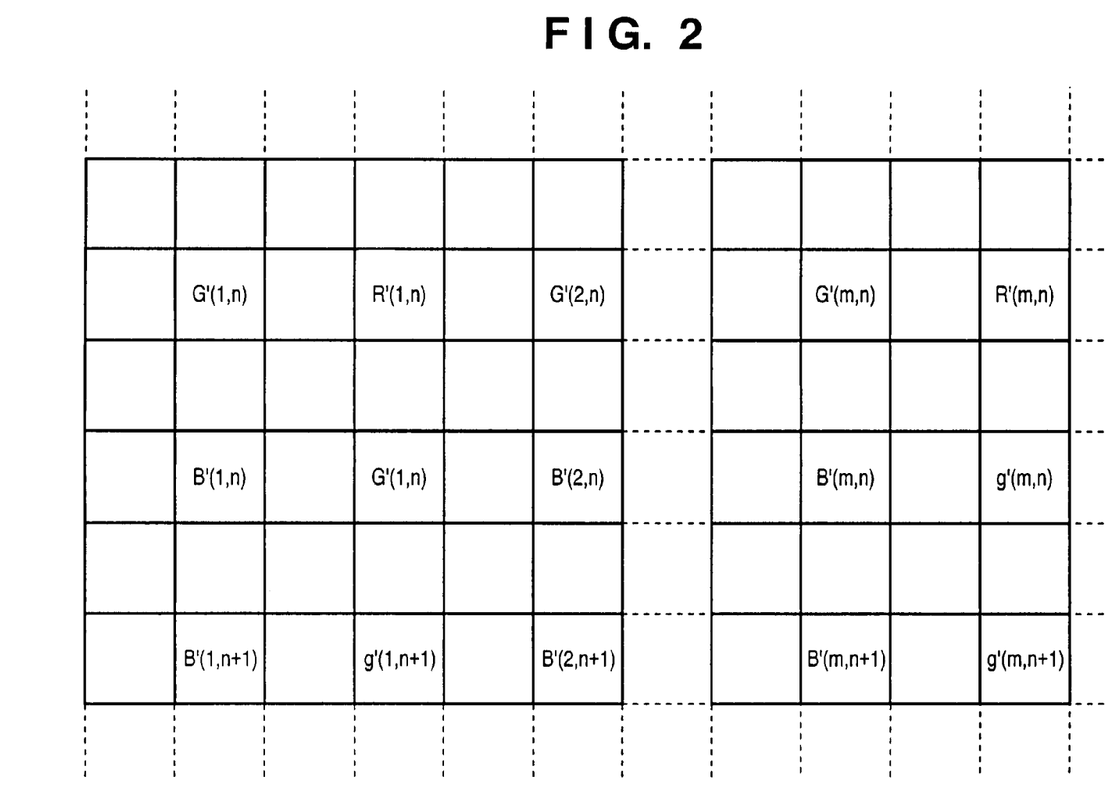
FIG. 2 is a view for explaining the first embodiment of the image data reduction method according to the present invention.

FIGS. 1 and 2 are views for explaining the first embodiment of an image data reduction method according to the present invention. The first embodiment will exemplify a case in which the number of pixels is reduced to ½ in both the longitudinal and lateral directions.

FIG. 1 shows the planar layout of data before a reduction process, and data have a Bayer array of the four G, R, B, and g colors. In FIG. 1, m and n are integers of 1 or more.

FIG. 2 shows the planar layout of data after the reduction process, and data have a Bayer array of the four G, R, B, and g colors, similar to FIG. 1.

For example, the transformations of the reduction process according to the first embodiment are given by $$G'(m, n) = (G(2m-1, n) + G(2m, n) + G(2m-1, n+1) + G(2m, n+1))/4 \quad (1\text{-}1)$$

$$R'(m, n) = (R(2m, n) + R(2m, n+1))/2 \quad (1\text{-}2)$$

$$B'(m, n) = (B(2m-1, n+1) + B(2m, n+1))/2 \quad (1\text{-}3)$$

$$g'(m, n) = g((2m, n) + g(2m-1, n+1) + g(2m+1, n+1) + g(2m, n+2) + 4 \times g(2m, n+1))/8 \quad (1\text{-}4)$$

As shown in FIG. 2, equations (1-1) to (1-4) are so set as to make the pitches between the barycenters of data after the reduction process equal to each other.

In addition to equations (1-1) to (1-4), the first embodiment provides transformations that implement equal pitches between the barycenters of data after the reduction process, which is the gist of the present invention. These transformations can also implement the present invention. For example, equations (1-2) and (1-3) are replaced by $$R'(m, n) = (R(2m, n-1) + 2 \times R(2m, n) + 2 \times R(2m, n+1) + R(2m, n+2))/6 \quad (1\text{-}2')$$

$$B'(m, n) = (B(2m-2, n+1) + 2 \times B(2m-1, n+1) + 2 \times B(2m, n+1) + B(2m+1, n+1))/6 \quad (1\text{-}3')$$

The following transformations which process the G and g colors as the same color are also applicable to the present invention:

$$G'(m, n) = (G(2m-1, n) + G(2m, n) + G(2m-1, n+1) + G(2m, n+1) + 4 \times g(2m-1, n))/8 \quad (1\text{-}1')$$

$$g'(m, n) = (G(2m, n+1) + G(2m+1, n+1) + G(2m, n+2) + G(2m+1, n+2) + 4 \times g(2m, n+1))/8 \quad (1\text{-}4')$$

Second Embodiment

Figure 3:
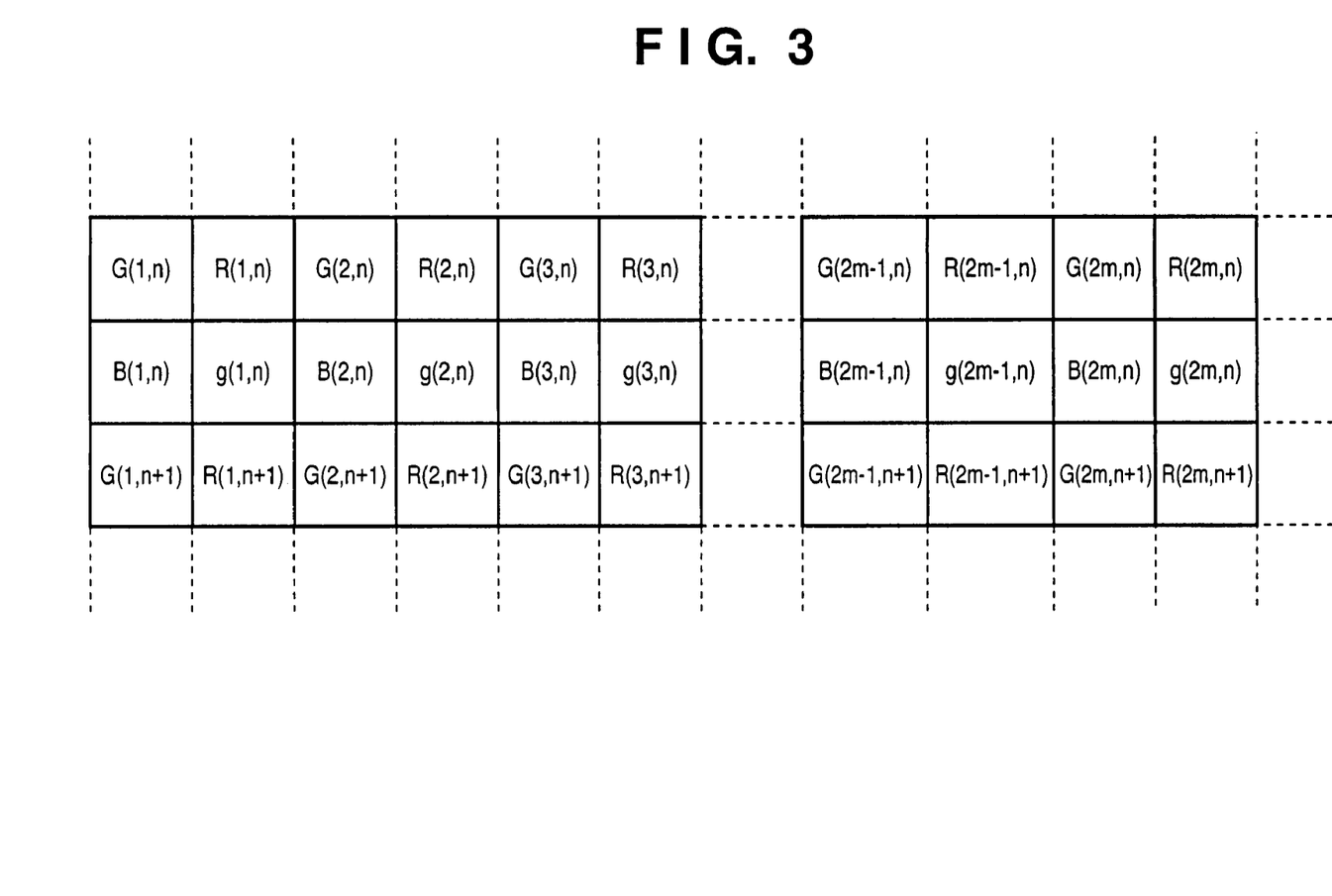
FIG. 3 is a view for explaining the second embodiment of an image data reduction method according to the present invention.
Figure 4:
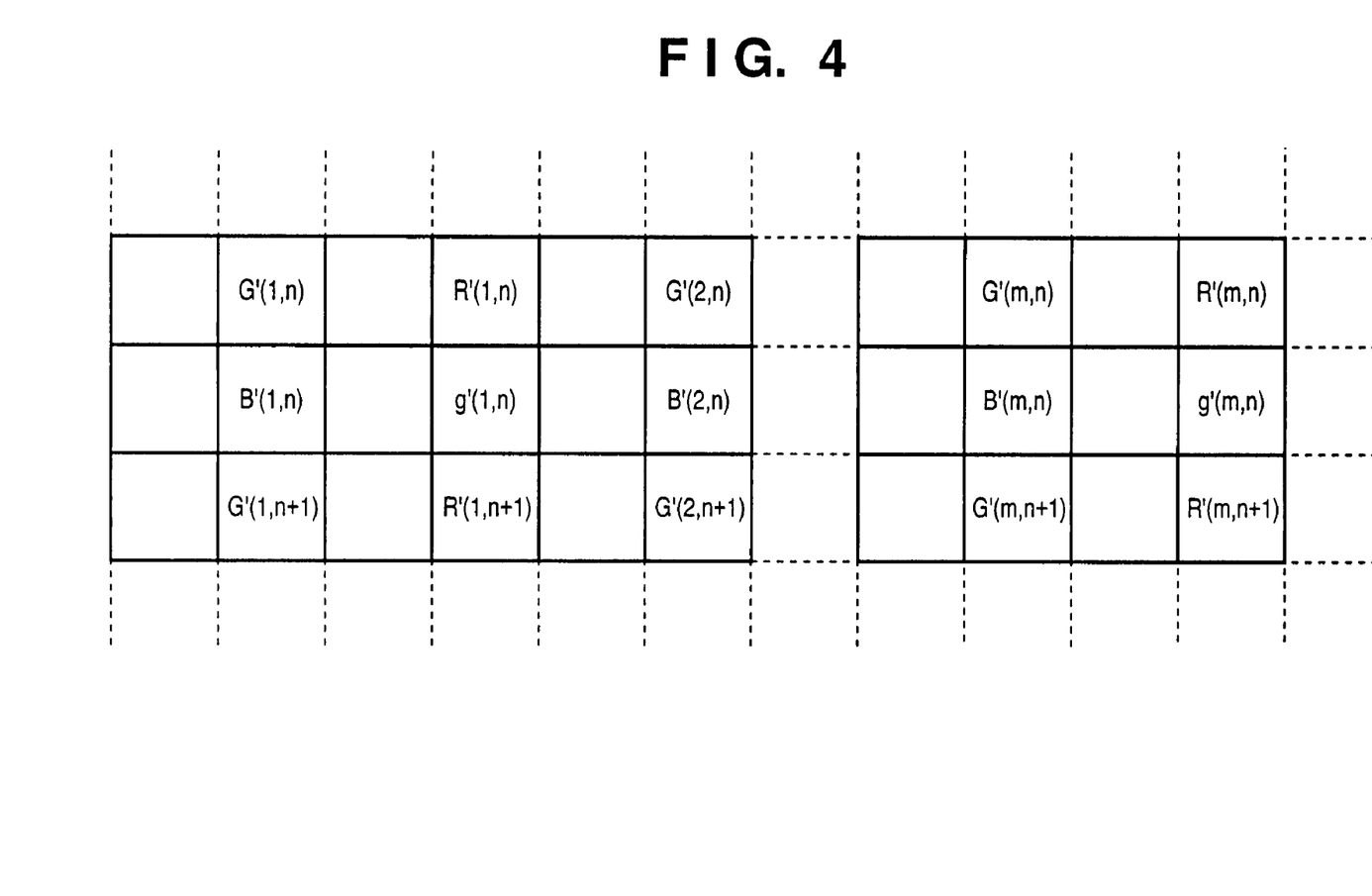
FIG. 4 is a view for explaining the second embodiment of the image data reduction method according to the present invention.

FIGS. 3 and 4 are views for explaining the second embodiment of an image data reduction method according to the present invention. The second embodiment will exemplify a case in which the number of pixels is reduced to ½ in only the lateral direction.

FIG. 3 shows the planar layout of data before a reduction process, and data have a Bayer array of the four G, R, B, and g colors. In FIG. 3, m and n are integers of 1 or more.

FIG. 4 shows the planar layout of data after the reduction process, and data have a Bayer array of the four G, R, B, and g colors, similar to FIG. 3.

For example, the transformations of the reduction process according to the second embodiment are given by $$G'(m,n)=(G(2m-1,n)+G(2m,n))/2 \quad (2\text{-}1)$$

$$R'(m,n)=(R(2m-1,n)+2\times R(2m,n)+R(2m+1,n))/4 \quad (2\text{-}2)$$

$$B'(m,n)=(B(2m-1,n)+B(2m,n))/2 \quad (2\text{-}3)$$

$$g'(m,n)=(g(2m-1,n)+2\times g(2m,n)+g(2m+1,n))/4 \quad (2\text{-}4)$$

As shown in FIG. 4, equations (2-1) to (2-4) are so set as to make the pitches between the barycenters of data in the lateral direction after the reduction process equal to each other.

In addition to equations (2-1) to (2-4), the second embodiment provides transformations that implement equal pitches between the barycenters of data after the reduction process, which is the gist of the present invention. These transformations can also implement the present invention. For example, equations (2-2) and (2-4) are replaced by $$R'(m,n)=R(2m,n) \quad (2\text{-}2')$$

$$g'(m,n)=g(2m,n) \quad (2\text{-}4')$$

The second embodiment has described the reduction process in only the lateral direction, but a reduction process in only the longitudinal direction can also similarly be achieved.

Third Embodiment

Figure 5:
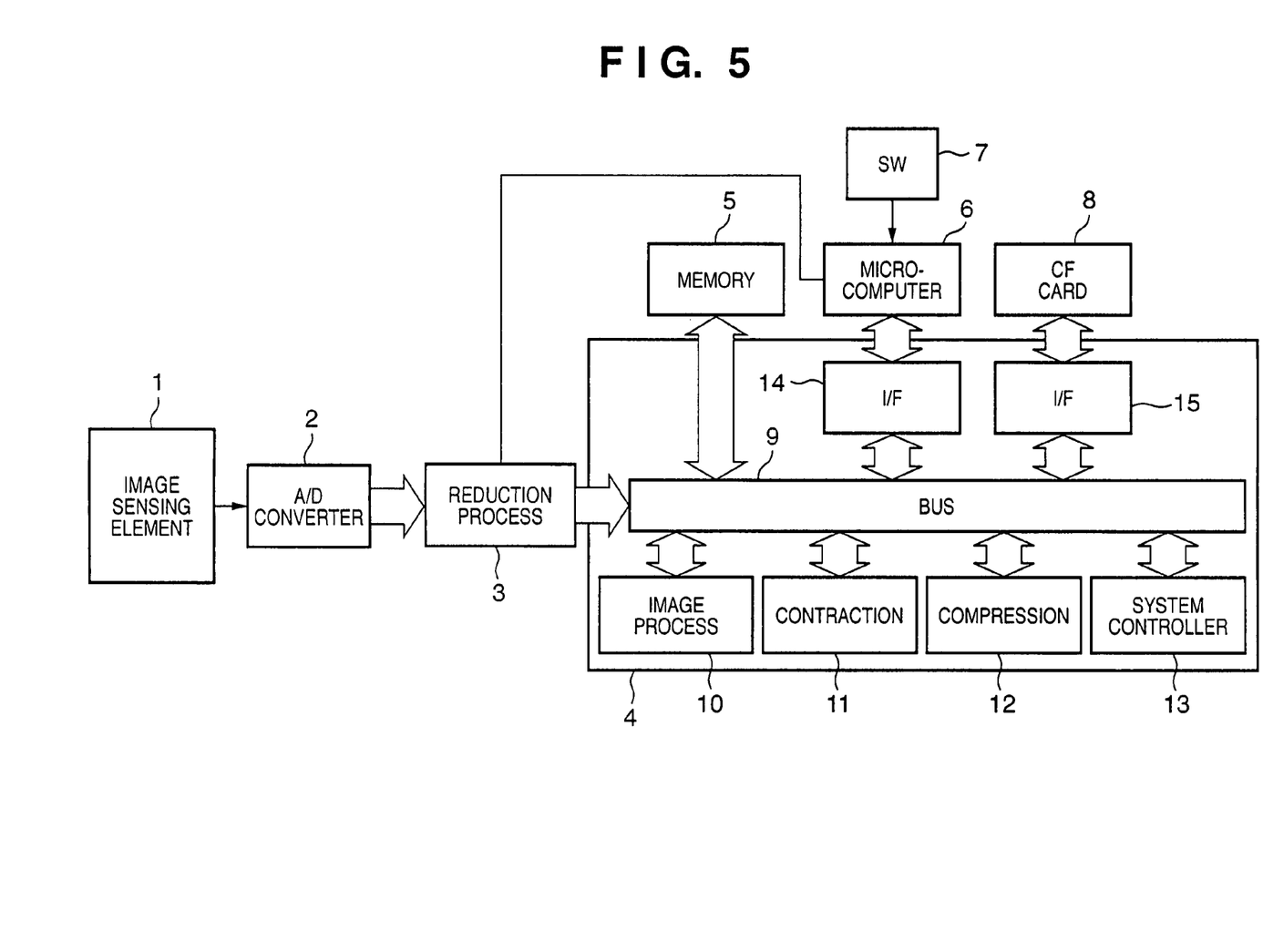
FIG. 5 is a block diagram showing an example of the configuration of a digital camera to which the image data reduction method of the present invention is applied.

FIG. 5 is a block diagram for explaining the third embodiment in which the present invention is applied to a digital still camera.

In FIG. 5, reference numeral 1 denotes a color image sensing element of a so-called Bayer array in which columns of repetitive G and R pixels and columns of repetitive B and G pixels are alternately arrayed; 2, an A/D converter; 3, a reduction processing circuit; 4, a digital signal processing circuit; 5, a memory; 6, a microcomputer; 7, an operation switch; and 8, a recording medium such as a compact flash® card. The digital signal processing circuit 4 incorporates a bus 9, image processor 10, contraction circuit 11, compression circuit 12, system controller 13, microcomputer interface 14, recording medium interface 15, and the like. The operation switch 7 includes a release button for photographing, and a pixel count selection button for selecting the number of recording pixels.

The outline of operation from photographing to recording will be explained step by step.

When the microcomputer 6 recognizes an operation to the release button of the operation switch 7, the microcomputer 6 forms an object image on the image sensing element 1 via an image sensing optical system (not shown). After a proper exposure period, analog image data is read out column by column from the image sensing element 1. The analog image data is converted into digital data by the A/D converter 2, and the digital data is supplied as the first digital image data to the reduction processing circuit 3.

The reduction processing circuit 3 receives pixel count selection information of the pixel count selection button of the operation switch 7 from the microcomputer 6. If a reduction process is unnecessary, the first digital image data is directly sent to the digital signal processing circuit 4; if a reduction process is necessary, digital image data having undergone the reduction process is sent as the second digital image data to the digital signal processing circuit 4.

The digital signal processing circuit 4 sequentially sets control signals to respective units such as the system controller 13 from the microcomputer 6 via the microcomputer interface 14 and bus 9. The second digital image data undergoes a predetermined image process by the image processor 10. The image processor 10 executes the following process. The third embodiment adopts a color image sensing element of a Bayer array. Pixels covered with green filters are interpolated by signals from pixels covered with red filters on two sides of each of the green filters in the horizontal direction, forming signals of a red component. Also, the pixels covered with green filters are interpolated by signals from pixels covered with blue filters on two sides of each of the green filters in the vertical direction, forming signals of a blue component. The same interpolation process is done for pixels on which red filters or blue filters are arranged. After the process by the image processor, if necessary, the second digital image data is contracted by the contraction circuit 11, for example, JPEG-compressed by the compression circuit 12, and recorded on the recording medium 8 in a proper file format via the recording medium interface 15.

The second digital image signal changes in format through a series of processes, and is exchanged between the building units of the digital signal processing circuit 4 and the memory 5 via the bus 9. When the second digital signal is obtained by reducing the number of pixels by the reduction processing circuit 3, the processing amount by the units of the digital signal processing circuit 4 and the traffic of the bus 9 decrease in comparison with a digital signal subjected to no reduction process, shortening the time of a series of processes.

In the third embodiment, the processing method changes as follows between a case in which an image is obtained without decreasing the resolution and a case in which an image is obtained by decreasing the resolution.

The case in which the resolution is not decreased will be explained.

A signal is input to the digital signal processing circuit and undergoes a signal process without performing any reduction process by the reduction processing circuit 3 regardless of selecting a still picture mode in which one still picture is taken every time the release switch is pressed or a sequential shooting mode in which a plurality of still pictures are sequentially taken every time the release switch is pressed.

The case in which the resolution is decreased will be explained.

A signal undergoes a reduction process by the reduction processing circuit 3, is input to the digital signal processing circuit 4, and undergoes a signal process regardless of selecting the still picture mode in which one still picture is taken every time the release switch is pressed or the sequential shooting mode in which a plurality of still pictures are sequentially taken every time the release switch is pressed.

The third embodiment is particularly effective for the sequential shooting mode in which sequential shooting is performed by decreasing the resolution because the number of pixels is reduced before input to the digital signal processing circuit 4.

The reduction processing circuit 3 is configured in accordance with transformations as described in the first and second embodiments so as to make the pitches between the barycenters of data after a reduction process equal to each other. Thus, a final image which hardly degrades in comparison with a conventional image can be attained.

The contraction circuit 11 generates a final image by contraction in a direction in which no reduction process is done when the reduction processing circuit 3 executes a reduction process in only the lateral or longitudinal direction, as described in the second embodiment.

In the first and second embodiments, the planar layout of signals is a so-called Bayer array. However, the present invention can also be applied to an array of another type.

As described above, according to the embodiments, the data amount in subsequent processes can be decreased, and a high-quality final image can be obtained by performing a reduction process in the longitudinal or lateral direction or both the longitudinal and lateral directions.

Other Embodiment

The object of the embodiments is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the functions of the above-described embodiments are also realized when the program codes read out from the storage medium are written in the memory of a function expansion card inserted into the computer or the memory of a function expansion unit connected to the computer, the CPU of the function expansion card or function expansion unit performs some or all of actual processes on the basis of the instructions of the program codes.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2003-361134 filed on Oct. 21, 2003, which is hereby incorporated by reference herein.

What is claimed is:

1. An image data reduction apparatus that reduces a number of pixels of image data of one line in which a pixel of a first color and a pixel of a second color are alternately arrayed in a row or column direction, comprising:
   a first color calculation unit that calculates a first color image data from X (X is an even number not less than 2) successively arranged pixels of the first color on the line in the row or columns direction;
   a second color calculation unit that calculates a second color image data from X+1 successively arranged pixels of the second color on the line in the row or columns direction;
   a reduction unit that reduces the number of pixels of the one line in the row or column direction to 1/X by alternately outputting in the row or column direction;
   the first color image data corresponding to a pixel positioned at barycenter on the one line of X successively arrayed pixels of the first color on the one line in the row or column direction, where the barycenter position of the X successively arrayed pixels of the first color on the one line in the row or column direction is the position where the X successively arrayed pixels balance each other and
   the second color image data corresponding to a pixel positioned at barycenter on the one line of X+1 successively arrayed pixels of the second color on the one line in the row or column direction, where the barycenter position of the X+1 successively arrayed pixels of the second color on the one line in the row or column direction is the position where the X+1 successively arrayed pixels balance each other.

2. The apparatus according to claim 1, wherein said reduction unit generates the first color image data by mixing image data of a plurality of pixels in the X pixels.

3. The apparatus according to claim 2, wherein said reduction unit generates the first color image data by mixing image data of the X pixels.

4. The apparatus according to claim 1, wherein said reduction unit outputs image data of a center pixel of the X+1 pixels as the second color image data.

5. The apparatus according to claim 1, wherein said reduction unit outputs image data of a plurality of pixels which include a center pixel of the X+1 pixels as the second color image data.

6. The apparatus according to claim 5, wherein said reduction unit generates the second color image data by mixing image data of the X+1 pixels.

7. An image data reduction method of reducing a number of pixels of image data of one line in which a pixel of a first color and a pixel of a second color are alternately arrayed in a row or column direction, comprising the step of:
   calculating a first color image data from X (X is an even number not less than 2) successively arranged pixels of the first color on the line in the row or columns direction;
   calculating a second color image data from X+1 successively arranged pixels of the second color on the line in the row or columns direction;
   reducing the number of pixels of the one line in the row or column direction to 1/X by alternately outputting in the row or column direction;
   the first color image data corresponding to a pixel positioned at barycenter on the one line of X successively arrayed pixels of the first color on the one line in the row or column direction, where the barycenter position of the X successively arrayed pixels of the first color on the one line in the row or column direction is the position where the X successively arrayed pixels balance each other and
   the second color image data corresponding to a pixel positioned at barycenter on the one line of X+1 successively arrayed pixels of the second color on the one line in the row or column direction, where the barycenter position of the X+1 successively arrayed pixels of the second color on the one line in the row or column direction is the position where the X+1 successively arrayed pixels balance each other.

8. A computer readable medium that records a program causing a computer to execute an image data reduction method defined in claim 7.

9. A storage medium computer-readably storing a program defined in claim 8.

10. The method according to claim 7, wherein said reduction step generates the first color image data by mixing image data of a plurality of pixels in the X pixels.

11. The method according to claim 10, wherein said reduction step generates the first color image data by mixing image data of the X pixels.

12. The method according to claim 7, wherein said reduction step outputs image data of a center pixel of the X+1 pixels as the second color image data.

13. The method according to claim 7, wherein said reduction step outputs image data of a plurality of pixels which include a center pixel of the X+1 pixels as the second color image data.

14. The method according to claim 13, wherein said reduction step generates the second color image data by mixing image data of the X+1 pixels.

* * * * *